United States Patent [19]

Crawford

[11] 4,270,154
[45] May 26, 1981

[54] HEAD SELECTION TECHNIQUE

[76] Inventor: John E. Crawford, 4805 Coopers La., Hyattsville, Md. 20784

[21] Appl. No.: 42,201

[22] Filed: May 24, 1979

Related U.S. Application Data

[63] Continuation of Ser. No. 882,324, Mar. 1, 1978, abandoned.

[51] Int. Cl.³ .................... G11B 5/012; G11B 15/12
[52] U.S. Cl. .................................. 360/98; 360/72.1; 360/63; 360/137
[58] Field of Search ........................ 360/97–99, 360/78, 72, 55, 63, 35, 137

[56] References Cited

U.S. PATENT DOCUMENTS

| | | | |
|---|---|---|---|
| 2,519,725 | 8/1950 | White | 360/72 |
| 3,772,666 | 11/1973 | Scholz et al. | 360/98 |

FOREIGN PATENT DOCUMENTS 4642846  9/1968  Japan .................................. 360/35

OTHER PUBLICATIONS

IBM/TDB, vol. 14, No. 7 (Dec. '71), pp. 2206–2207, "High Performance Storage Device" by Evans et al.

Primary Examiner—John H. Wolff
Attorney, Agent, or Firm—Burns, Doane, Swecker & Mathis

[57] ABSTRACT

Method for recording and reading data in a disc storage unit is disclosed. The method includes providing a plurality of stacks of read/write heads mounted about the periphery of the disc pack. An additional feature includes the capability for prepositioning at least one of the stacks while another stack is performing a read or write operation. Also provided is means for simultaneously performing a separate read or write operation with each of at least two of the stacks. By the present invention, disc access time is minimized through a time based selection of an optimally located head.

6 Claims, 6 Drawing Figures

*COMMAND CHANNEL

HEAD SELECTION TECHNIQUE

This is a continuation of application Ser. No. 882,324, filed Mar. 1, 1978, now abandoned.

BACKGROUND AND SUMMARY OF THE INVENTION

The present invention relates to a disc storage device for digital data as a peripheral device to one or more computer systems. More particularly, the present invention relates to a device in the form of a plurality of arms or stacks of read/write heads which are so positioned and operated as to minimize disc access time. The plurality of arms or stacks are combined with additional components which allow optimum utilization of such stacks. Furthermore, the freedom of access and other features inherent in the single stack system are retained.

Present disc systems are primarily of two basic types. One type of disc system is the fixed head type, i.e., with no movement of the read/write heads. Many heads are generally utilized and cost effectiveness is poor. Performance in most applications is also poor. The second type system is the moveable type, in which there is utilized a single stack or arm of read/write heads. In this second system, the mechanism electro-mechanically moves the heads transversely across the disc or platter surfaces between the periphery and the center portions of the discs. This second type system is more flexible than the fixed head type and there is much more storage capacity per head. Both of the foregoing prior art types of disc systems suffer from a common weakness, i.e., all read/write operations must wait until the specific portion of the particular disc surface that is to be operated upon revolves to coincidence with the appropriate disc head. Such operations result in a large latency ranging from virtually zero to one complete cycle, or more, of disc revolution, hence a bottleneck in input/output operations. U.S. patents which disclose such prior art systems include, for example, U.S. Pat. Nos. 3,219,979, 3,148,362, 3,973,274, 3,893,178, and 3,559,192.

By the present invention, there is provided an improved apparatus for minimizing disc access time in disc storage systems. The apparatus of the present invention includes a plurality of arms or stacks of read/write heads which are mounted around the periphery of the vertical disc pack. The use of such a plurality of stacks of heads has been found to markedly reduce disc access latencies. Additional features of the invention include: (a) means for prepositioning at least one of said stacks of heads while another stack is performing a read or write operation; and (b) means for simultaneously performing a separate read or write operation with each of at least two stacks of heads.

The present invention and its various embodiments are possible and effective irrespective of the basic characteristics of the particular disc system configuration. However, an optimization of all of the characteristics of the present invention and their integral relationship is possible and/or desirable. Such optimization primarily becomes a function of selecting the total power or capability of the new system that is required for each general application and configuring it appropriately.

By the present invention, the average disc access time for read or write operations will be reduced by at least 50% as compared to the present systems. Due to the improved features of the present invention as described above, the effective through-put capability and compute power of computer systems which employ the present invention will be tremendously increased. Data file and/or library structures will be greatly simplified, particularly for large information storage and retrieval systems. In addition, the general responsiveness of computer systems to user's needs will be greatly enhanced. The actual design of multi-user operating systems will be greatly simplified. I/O queueing operations, task or program scheduling, roll in or out of tasks, and the like will all be simplified. Larger programs may also be designed, in segments using the disc system as an extension of memory (non-executable). The cost effectiveness of computer systems will be greatly enhanced because of the many advantages as listed above.

A primary feature of the present invention includes the utilization of one or more additional arms or stacks of read/write heads. The various embodiments of the present invention are primarily intended for use with disc systems employing moveable heads. However, the present invention could also be employed in the case of a fixed head configuration. Such a configuration would effectively reduce the disc revolution latency.

BRIEF DESCRIPTION OF THE DRAWINGS

The advantages and features of the present invention will be more fully understood from the following description of the preferred embodiments, taken in conjunction with the accompanying drawings, wherein.

DESCRIPTION OF THE PREFERRED EMBODIMENTS

Figure 1:
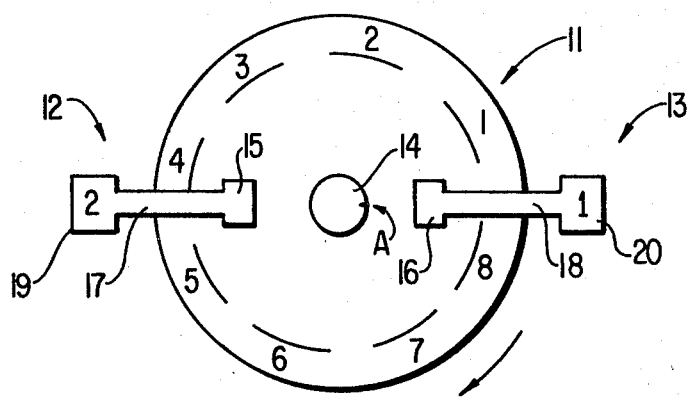
FIG. 1 is a schematic and block diagram of a plan view of the disc storage device of the present invention.

In the embodiment of the invention as illustrated in FIG. 1, there is shown a plan view in schematic of a vertical disc pack 11 having a pair of moveable stacks 12, 13 of read/write heads mounted 180° apart around the periphery of the disc pack 11. The disc pack 11 includes a plurality of recording discs fixed in a conventional manner so that they rotate together and being removable and replaceable as a single unit on the disc drive (not shown) which is interconnected with the disc spindle 14. Each disc surface (usually both top and bottom) is coated with a magnetic material suitable for the magnetic recording of data thereon.

Each of the stacks 12, 13 is of the conventional type for reading and writing data on the disc surfaces, including a plurality of read/write heads 15, 16 which are mounted on arms, 17, 18 supported on carriages 19, 20 for movement radially across the respective disc surface. The stacks 12, 13 may be of the type described, for example, in U.S. Pat. No. 3,893,178 which is incorporated herein by reference. In such stacks, generally a separate arm and multiple head configuration is provided for each surface of each disc in the disc pack 11 which is suitable for magnetic recording of data thereon. Thus the plurality of heads for each of the stacks 12, 13 are moved across the associated disc surfaces in a conventional manner for recording data in concentric positions called data tracks which together form an imaginery vertically extending cylinder extending through the disc pack and described by the position of the corresponding tracks on all of the disc surfaces of a single disc drive. Connecting with each head is an electrical connection leading to a disc control unit, as described further in connection with FIG. 4, which is suitable for transmitting data to the heads and receiving data from the heads after being read from the disc surfaces for processing of the data and/or transmission of the data to a central processing unit such as a user computer.

In the operation of disc units utilizing two moveable read/write head stacks, as shown in FIG. 1, the following are some basic assumptions, many of which are purely arbitrary, but, because of their inter-relationships with each other, are necessarily optimized during the design phase of a disc system:

A. A constant revolution speed of the disc spindle (motor);

B. A revolution direction (arbitrary) as shown in FIG. 1;

C. The number of disc platters and recording surfaces may vary from system to system;

D. The number of data tracks per surface may vary from system to sytem;

E. The number of data sectors per track may vary from system to system;

F. The number of data tracks per surface and data sectors per track is constant for each disc unit;

G. The data sector size and gap size (null area) each may vary from system to system; and H. The data sector size and gap size each are constant for all corresponding tracks within each cylinder of a disc unit.

With reference to FIG. 1, a starting or reference point may be established, hereinafter referred to as $T\phi$. $T\phi$ is defined as an initial, and constantly repeating, point in time when the geometric position of the disc spindle 14 (and platters) is precisely known. $T\phi$ is defined as occurring when Point A of the spindle 14 extended radially, during the revolution of the spindle, becomes coincident with an established physical point (Point 1) that is peripheral to the center of the spindle. Point 1 is the position at which head stack #1 (Element 13) is located. Point 2 is the position at which stack #2 (Element 12) is located relative to the center of the disc spindle 14, 180° displaced from head stack #1. The disc platters are physically attached to the disc spindle 14 around, and upon, which they revolve.

Only eight sectors per track are depicted in FIG. 1. However, it is recognized that many more than that may be configured, with an appropriate adjustment of the algorithm. It is assumed that each platter and recording surface comprising the disc platter array (hidden in the top view) are similarly configured as the top view surface. The gap preceding each data sector and the sector, itself, are considered, collectively, to represent one sector's worth of disc revolution time. Similarly, in FIG. 2, the labels $T\phi$, T1, T2, etc. each represent a sector's worth of disc revolution time. Also, in FIG. 2, the small graduations of the main timing chain are intended to indicate that the timing chain may be measured (or incremented) to whatever degree of precision might be desired, so that fractional units of disc revolution time may be accounted for, and considered, as necessary.

Figure 2:
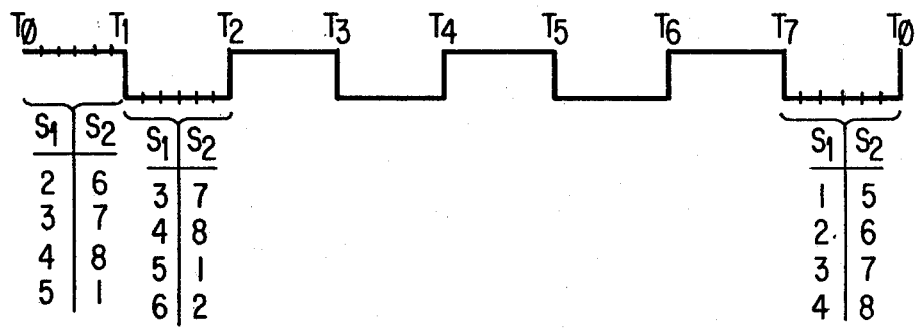
FIGS. 2 and 3 are two charts showing the timing chain and head stack assignments for two embodiments of the present invention.

Assuming an indication of $T\phi$ has occurred, a timing chain or clock may be commenced, the total duration of which is previously known, based on the total revolution time of the disc pack motor, as shown in FIG. 2.

The disc unit, upon receipt of a user computer's request for a read or write operation, must have the means of selecting the appropriate head stack (#1 or #2) which can first commence the operation after receipt of the request. Inasmuch as these requests may be received at any time, the disc platters may be in any geometric position relative to the head stacks at that instant in time. Further, the position of the platters relative to each head stack is a necessary factor that must be considered in determining the appropriate head stack.

Other factors must be considered, such as; traversing time of the heads (cylinder to cylinder), head stack switching, head switching, and the calculation time of the algorithm itself, which is a function of the method that is used to perform it. In any event, the latency time that is introduced by the algorithm into the total system latency can be pre-determined in the design phase and is easily calculated as a part of the total system latency.

As a means of demonstrating the algorithm, and the manner in which system latency is resolved, a few basic assumptions are necessary regarding this latency. Because the cylinder to cylinder stack traversing time is the largest non-linear variable of the system latencies, other than disc revolution time which is a linear function, and is not easily illustrated in a timing/assignment chart, it will be treated separately. Except for the latencies due to disc revolution time and head traversing time, the balance of the system latencies will be assumed to be of a constant nature. With reference to FIG. 1, this balance of system latencies is assumed to be equal to the gap's worth of disc revolution time that precedes each data sector area. As indications of $T\phi$, T1, T2, etc. occur, they are assumed to have occurred during some measurable, if infinitesimal, portion of gap revolution time.

Figure 3:
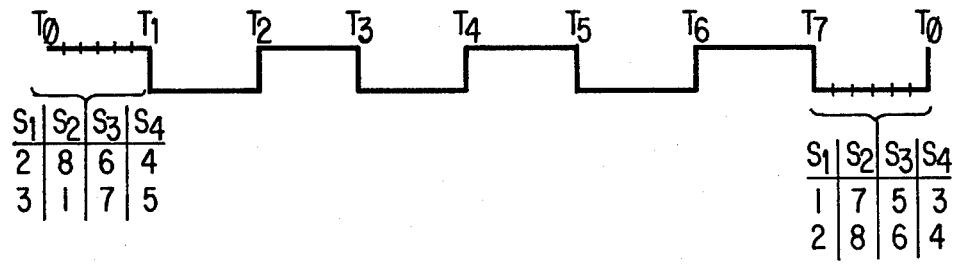

FIG. 3 shows the timing chain and head stack assignment for an embodiment of the invention having more than two stacks, in this case four stacks. In the embodiment related to FIG. 3, there are four stacks, located 90° apart around the periphery of the disc pack, and with eight data sectors per track. A system latency similar to the two stack system of FIG. 2 is assumed.

OPERATION OF THE SYSTEM WITH A PLURALITY OF STACKS ALGORITHM NO. 1

It is not practical to demonstrate all combinations of the variables as they would pertain in practice, nevertheless, the algorithm is designed to accomodate any eventuality. With reference to FIG. 1, at $T\phi$, sector #1 will be the first sector to pass through stack #1, and, will be followed, in turn, by sectors #2, #3, #4, etc. Similarly, sector #5 will be the first sector to pass through stack #2, followed, in turn, by sectors #6, #7, #8, etc. Further, at $T\phi$, it can be seen that data sector #1 has not yet reached coincidence with stack #1. However, since an indication of $T\phi$ has occurred, some amount of disc revolution time has transpired beyond $T\phi$. Because of the prior assumption that the constant system latencies are equal to one gap's worth of disc revolution time, stack #1 cannot be prepared (or placed in a ready state) for an operation to commence on data sector #1 (if desired) through stack #1. A similar situation prevails with data sector #5 relative to stack #2 at T$\phi$. Thus, the timing/assignment chart has been developed as shown in FIG. 2, which accounts for the constant system and disc revolution latencies. Accordingly, at T$\phi$, and until an indication of T1, before considering the head traversing latency, if applicable, the appropriate stack selection through which an operation is to commence is stated as:

Stack #1=sectors #2, #3, #4, #5
Stack #2=sectors #6, #7, #8, #1

It follows then, that during the time interval of T1 until T2, the appropriate stack selection is:

Stack #1=sectors #3, #4, #5, #6
Stack #2=sectors #7, #8, #1, #2

A similar progression of sector assignments for each stack occurs for each increment of T by the main timing chain, until the next indication of T$\phi$, at which time the process starts over again. Thus, the selection algorithm refers to the timing/assignment chart information to determine which stack is the best candidate for selection for a given operation (nearest in disc revolution time, and, accounting for the constant system latencies relative to the desired data sector at which the operation is to commence).

After determining this, it must then calculate the cylinder to cylinder head traversing latency, if applicable, for this candidate. In so doing, it is assumed that the algorithm has access to information concerning the present or current cylinder positions of the heads of each stack and further, that it has access to information as to head traversing times, cylinder to cylinder.

There are many ways to proceed with the remaining calculations. Basically, the algorithm must determine whether or not the head traversing latency is greater than the sum of the disc revolution and constant system latencies that exists between the desired data sector and the candidate stack. If not, the candidate stack is appropriate and no further calculations are necessary. If so, and the head traversing latencies for the given system never exceed the sum of one half of the disc revolution time, and the constant system latency—then, the algorithm can, by simple default, select the other stack. If this is not the case, the algorithm must make similar calculations for the second stack as for the first one, i.e., head traversing time of the second stack versus the disc and constant latencies. If this proves unsuccessful (the second stack is not the appropriate one), and, the traversing latencies in the given system never exceed the sum of one complete disc revolution time, and, the constant system latency—then, the algorithm can, by simple default, select the original candidate stack as being the appropriate one. The algorithm can make this determination in its initial calculations for the original candidate, but, it would not be valid without also testing the latency relationships of the second stack, i.e., the traversing latency of the second stack can be much less than for the first, or zero. Further, the second stack has an additional one-half of disc revolution time against which to apply its traversing latency, which can result in its selection as the appropriate stack. If the traversing latency can exceed the sum of one complete disc revolution time, and the constant system latency—then, the algorithm must, once again, perform the necessary latency calculations for the first candidate stack, however, this time it must add in one disc revolution of time to the original timing/assignment chart calculation for this stack, against which the traversing latency is tested. Obviously, as many iterations of this procedure may be performed as necessary, until the appropriate stack selection is determined.

In the expansion of the system for more than two stacks, the algorithm can be expanded to accomodate a system such as a four stack configuration. An assignment and timing chart for a four stack configuration is shown in FIG. 3. In such a system it is assumed that there are four stacks, located 90° apart, and with 8 data sectors per track. A similar system latency is assumed as with two stacks. Basically, there must be known the number of stacks, which affects the fractional division of the disc revolution latency in the calculations by the algorithm.

A similar expansion of the algorithm is possible for any number of additional head stacks that might be desired. A divisional assignment of stacks and sectors is then possible in the progressive manner as shown in the two and four stack configurations.

PRE-POSITIONING (LOOK-AHEAD) CAPABILITY FOR MULTI-HEAD STACKS ALGORITHM NO. 2

Multi-head stack systems make it possible to achieve significant advantages over the single stack type, in that the disc revolution latency is greatly reduced. By providing a capability whereby user computers can generate additional read or write requests while previous requests are being processed and operations are in progress, the application of the pre-positioning technique represents an additional reduction of system latency, in that, the inherent latency that is involved in traversing a head stack to the desired cylinder position can be greatly, or completely, minimized.

Upon receiving a user computer's request for a read or write operation, the algorithm must, through the pertinent information that it maintains, determine the appropriate head stack selection for the new request. If the calculations of the algorithm determine that any stack other than one currently being used, is the appropriate selection—then the pre-positioning operation (traversing of the stack to the desired cylinder position) may commence before the current read or write operation has terminated.

Basic assumptions are necessary, similar to those of Algorithm No. 1. Additionally, the algorithm must have at its disposal information as to: (a) currently selected head stack: (b) starting sector address of the current operation: and (c) length of the operation.

The procedure of this algorithm is similar to that of Algorithm No. 1, with two exceptions. First, it must calculate when the current operation will terminate (knowing the starting sector address and the length of the operation, it can predict the point in the main timing chain at which this will occur). Inasmuch as no new read or write operation can commence before then, the algorithm needs to determine the appropriate stack relative to that point in time. Hence, it treats the new request as though it were going to occur then. Thus, it can begin to implement the selection process as in Algorithm No. 1. Secondly, as the algorithm proceeds with the calculations, it can now subtract from the head traversing time of each candidate stack (excepting the traversing time of the currently used stack, if it is a candidate), the balance of time that remains until completion of the current operation. This can have a dramatic effect upon the algorithm as to the appropriate stack, but, more importantly, the impact upon system latency is even more profound.

In a special case of multi-pre-positioning, the capability for pre-positioning more than one stack can be provided for by the algorithm. Very simply, the algorithm would require the means of maintaining additional levels of information concerning the pre-positioned stacks, i.e., their order of request (first in, first out, etc.), starting sector address, length of operation.

SIMULTANEOUS MULTI READ/WRITE CAPABILITY ALGORITHM No. 3

With the configuration of more than one head stack per disc unit and the development of the associated Algorithms No. 1 and No. 2, in addition to the significant reduction of system latencies, another very powerful feature is now possible, i.e., simultaneous read or write operations. By configuring into the disc unit the appropriate read/write circuitry, any number and combination of read and/or write operations may be conducted simultaneously within the limit of the head stacks that are provided.

The selection algorithm, with similar assumptions as in Algorithms No. 1 and No. 2, is expanded as follows:

The initial request by a user computer will be serviced in the conventional manner, as with Algorithm No. 1. The algorithm requires the means to maintain descriptive information concerning currently on-going operations as with Algorithm No. 2, however, to a level equal to the number of simultaneous operations that are provided for. Once the operation of an initial request is in progress, and as additional requests are received from a user computer, there are numerous ways to proceed with the selection process.

Basically, the algorithm must first determine the availability of the required circuitry (read or write) as pertains to the new request. If the appropriate circuitry is available, the head stack selection calculations may commence, applying the pre-positioning technique, if applicable, similarly as in Algorithm No. 2. If the appropriate circuitry is not available, the request must be held in abeyance (on a queue) until such time as the appropriate circuitry becomes available. In this circumstance, which implies that the disc unit capability is fully engaged (at least for this type of operation, read or write), the algorithm must determine the first availability of the appropriate circuitry. This it can do by comparing the remaining lengths of the operations that are using this particular circuitry (similarly, as in Algorithm No. 2). But, it must determine the first availability of the circuitry and head stacks to the extent that, cylinder to cylinder traversing latencies of the candidate stacks are considered relative to their respective disc revolution latencies, both relative to the remaining lengths of the operation. This is a similar, if more extensive, function as with Algorithm No. 2 in its pre-positioning procedure. Once the selection has been made as to the appropriate head stack and circuitry, the stack and circuitry must be locked-out (reserved for this request—even if the operation is not to commence contiguous in time to the termination of other operations) to any new requests. This is a necessary measure to preclude the algorithm from becoming involved in complex priority arbitration decisions which should be undertaken at a higher system level. If this measure is not taken, subsequent requests of the same nature (through the normal process of the algorithm, because of the variable latencies, etc.) might be found to fit head stacks and circuitry ahead of (in time) the pending request and, thereby, cause an undue, or non-acceptable, delay of requests. Simply, the algorithm must function in a first in, first out, fashion.

Figure 4:
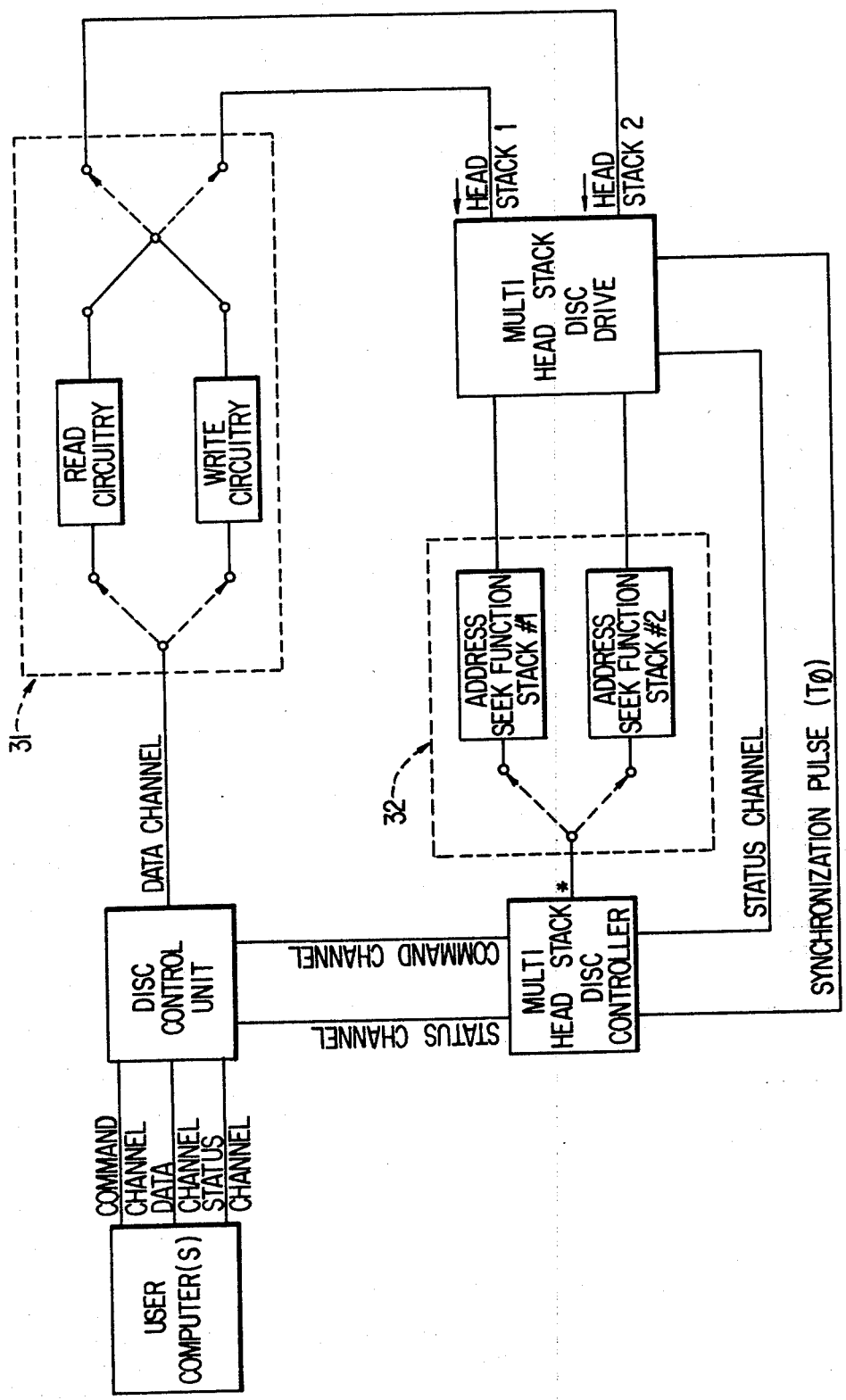
FIG. 4 is a schematic and block diagram of various components employed in the present invention.

In FIG. 4, there is shown a basic system configuration as applicable to the function of the Multi-Head Stack Disc Controller (M.H.S.D.C.). FIG. 4 illustrates a system having one data channel (read or write), two head stacks configured with the disc drive as in FIG. 1, and with the necessary switching functions. This system will accommodate pre-positioning of the unused head stack, if applicable, as determined by the M.H.S.D.C. The synchronization pulse shown in FIG. 4 occurs at the completion of each revolution of the disc spindle. The function of the Disc Control Unit is normal, as with conventional single stack disc drives, with the exception of the additional circuitry, etc., as required for multi-read/write operations and the necessary communications/protocol with the M.H.S.D.C. Also, the function and control of the data channels is normal, as with conventional systems, with the exception that the data must pass through the electronic head stack switching mechanism 31 which may be controlled by the M.H.S.D.C., thus, directing the data to the appropriate head stack.

The function of the electronic switching mechanism 32 is controlled by the M.H.S.D.C. as a means of directing the address seek commands to the appropriate head stack device. Accordingly, the function of the disc drive with respect to the traversing (seek) function, switching of the heads (track to track), and data track synchronization is as with conventional single head stack systems.

Figure 5:
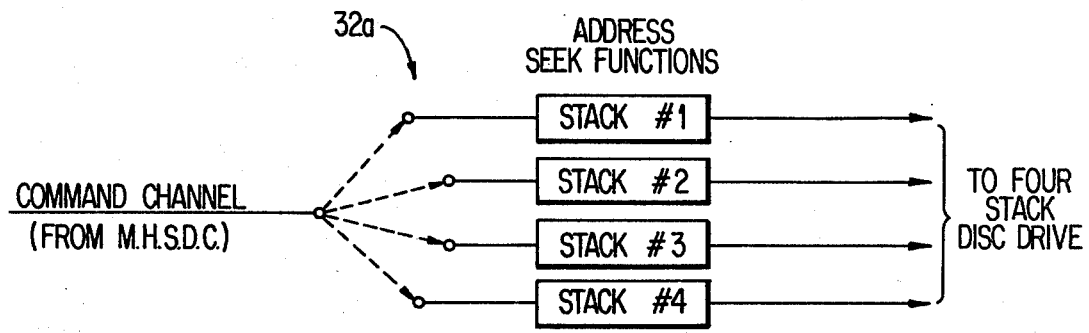
FIG. 5 is a schematic and block diagram of a first alternative embodiment of the invention shown in FIG. 4.
Figure 6:
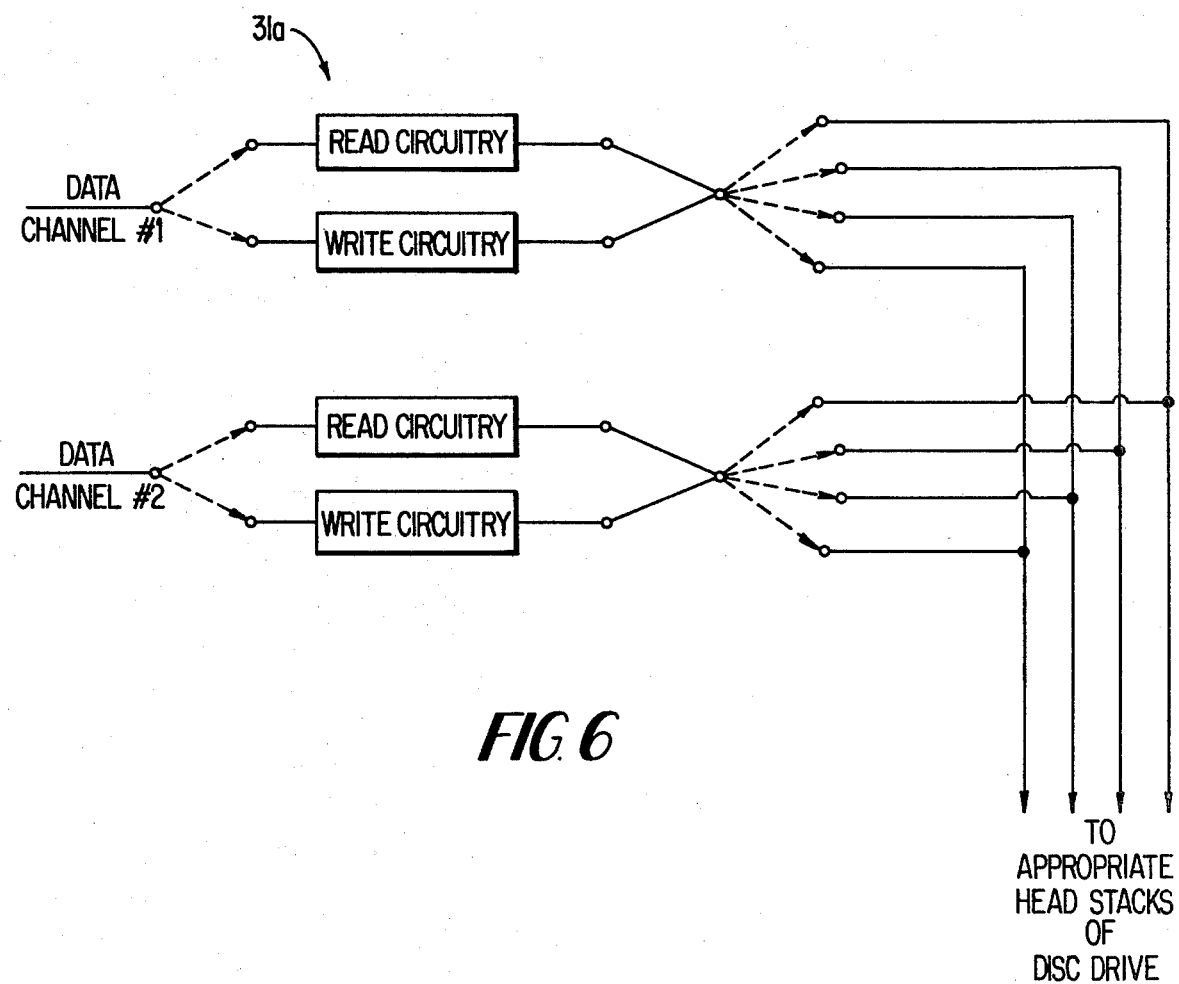
FIG. 6 is a schematic and block diagram of a second alternative embodiment of the invention shown in FIG. 4.

In FIG. 5, there is shown an expansion 32a of the switching mechanism 32 of FIG. 4 in order to accommodate four stacks of read/write heads which are configured in accordance with the present invention. In FIG. 6, there is shown an expansion 31a of the switching mechanism 31 of FIG. 4, showing two data channels. Thus FIG. 6 illustrates a system having two channels, the expansion of the read/write circuitry and the necessary switching system with a disc drive that is configured with four head stacks. The system of FIG. 6 will accommodate concurrent read/read, write/write, or read/write operations to/from any two of the head stacks. The two unused stacks are available for pre-positioning purposes, as determined by the M.H.S.D.C.

The various functions of the M.H.S.D.C. may be accomplished by any, or combinations of the numerous capabilities that are presently and generally available on the commercial market today. It may be accomplished wholly electronically using state of the art integrated circuitry, or in combination with, or separately, by using any one or combinations of the micro-processor logic systems (chips), that are presently and generally available on the market.

The state of the art is such that, when considering or approximating the number of operations that are necessary, and when considering the disc revolution latency and head cylinder to cylinder traversing latency (times) which average in the milli-seconds, the running time of the algorithm should be in the tens or, at the most (worst case), a few hundred micro-seconds, which is relatively insignificant. That is not to say that this time need not be considered when calculating system latency. However, when going through the various stages of its process, the algorithm, if found to be necessary, can temporarily increment a commensurate amount of time to the constant system latency.

It is thought that the invention and many of its attendant advantages will be understood from the foregoing description, and it will be apparent that various changes may be made in the apparatus as described herein without departing from the spirit and scope of the invention or sacrificing its material advantages, the forms hereinbefore described being merely perferred embodiments thereof.

It is claimed:

1. In a magnetic disc imformation storage system in which a plurality of concentric information tracks on a rotating magnetic disc storage unit are each accessible by at least two radially movable magnetic read/write heads circumferentially spaced from one another, a method for selecting one of said at least two magnetic heads to perform a read or write operation on a predetermined sector of a predetermined information track in response to a command signal, comprising the steps of:
   (a) determining a candidate magnetic head in response to the instantaneous position of the predetermined sector relative to the magnetic heads;
   (b) calculating the time it will take the candidate head to traverse from its instantaneous radial position to the radial position of the predetermined information track;
   (c) selecting the candidate head as the magnetic head to perform the read or write operation if the candidate head is capable of reaching the radial position of the predetermined information track prior to the time the predetermined sector passes the candidate head on the first revolution of the storage disc after receipt of the command signal;
   (d) selecting another magnetic head as the head to perform the read or write operation if said other head is capable of reaching the radial position of the predetermined information track prior to the time said predetermined sector passes the other head on the first revolution of the storage disc and if the candidate head cannot reach the predetermined information track prior to the time the predetermined sector passes the candidate head on the first revolution of the storage disc; and
   (e) selecting the magnetic head which is first able to reach the radial position of the predetermined information track prior to the time the predetermined sector passes it on a subsequent rotation of the storage disc as the head to perform the read or write operation if neither magnetic head is capable of reaching the radial position of the predetermined information track on the first revolution of the storage disc.

2. The method of claim 1 wherein said step of determining the candidate magnetic head includes the steps of:
   establishing an assignment chart indicating the magnetic head each sector will first pass after each increment of rotation of a magnetic storage disc;
   detecting when the magnetic storage disc is at a reference position during the rotation thereof;
   measuring the elapsed time since the storage disc was last at the reference position when a command signal is generated;
   determining the next magnetic head which a predetermined sector will pass by reference to the assignment chart and the elapsed time; and
   selecting the determined magnetic head as the candidate magnetic head.

3. The method of claim 1 further including the steps of:
   generating a second command signal while a previous read/write operation is being performed to indicate a subsequent read/write operation to be performed;
   carrying out steps (a)–(e) to select the proper magnetic head for the subsequent operation; and
   positioning the magnetic head selected for the subsequent operation at the radial position of the information track to be utilized during the subsequent operation prior to the time the previous operation is completed if the selected magnetic head is other than the magnetic head utilized in the previous operation.

4. The method of claim 3 further including the step of initiating the subsequent read/write operation as soon as the selected magnetic head is operatively positioned with respect to the sector of the information track to be utilized in the subsequent operation, regardless of whether the previous operation is completed.

5. In a magnetic disc information storage system in which a plurality of concentric information tracks on a rotating magnetic disc storage unit are each accessible by at least two radially movable magnetic read/write heads circumferentially spaced from one another, a method for reducing disc access time, comprising the steps of:
   generating a first command signal indicating a first read/write operation to be performed on a sector of an information track on a disc storage unit;
   selecting one of the magnetic heads to perform the read/write operation in dependence upon the time it takes each of said magnetic heads to reach an operative position with respect to the indicated sector;
   carrying out the first read/write operation with the selected magnetic head;
   generating a second command signal, prior to the completion of the first read/write operation, indicating a second read/write operation to be performed;
   selecting a magnetic head other than the magnetic head selected for the first operation to perform the second read/write operation; and
   initiating the positioning of the magnetic head selected for the second read/write operation towards the radial location of the information track to be used in the second operation prior to the time the first read/write operation is completed.

6. The method of claim 5 further including the step of carrying out the second read/write operation as soon as the second selected magnetic head reaches an operative position with respect to the information track sector on which the second operation is to be performed and prior to the time the first operation is completed, to thereby perform two read/write operations simultaneously.

* * * * *